US008379010B2

(12) United States Patent
Sato

(10) Patent No.: US 8,379,010 B2
(45) Date of Patent: Feb. 19, 2013

(54) IMAGE DISPLAY APPARATUS

(75) Inventor: Akinori Sato, Kirishima (JP)

(73) Assignee: LG Display Co., Ltd., Seoul (KR)

( * ) Notice: Subject to any disclaimer, the term of this patent is extended or adjusted under 35 U.S.C. 154(b) by 294 days.

(21) Appl. No.: 12/810,768

(22) PCT Filed: Dec. 26, 2008

(86) PCT No.: PCT/JP2008/073848

§ 371 (c)(1),
(2), (4) Date: Jun. 25, 2010

(87) PCT Pub. No.: WO2009/084681

PCT Pub. Date: Jul. 9, 2009

(65) Prior Publication Data

US 2010/0277460 A1 Nov. 4, 2010

(30) Foreign Application Priority Data

Dec. 28, 2007 (JP) ................................ 2007-340478

(51) Int. Cl.
*G09G 3/30* (2006.01)
*G09G 5/00* (2006.01)
*G06F 3/038* (2006.01)

(52) U.S. Cl. ........................ 345/211; 345/76; 315/169.3

(58) Field of Classification Search .............. 345/76–83, 345/204, 690, 211–213; 315/169.3
See application file for complete search history.

(56) References Cited

U.S. PATENT DOCUMENTS 7,812,793 B2 10/2010 Steer
2006/0125740 A1 6/2006 Shirasaki et al.
(Continued)

FOREIGN PATENT DOCUMENTS

CN 1345021 A 4/2002
CN 1705972 A 12/2005
(Continued)

OTHER PUBLICATIONS

R.M.A. Dawson et al., "Design of an Improved Pixel for a Polysilicon Active-Matrix Organic LED Display" SID98 Digest, pp. 11 to 14.

(Continued)

*Primary Examiner* — Stephen Sherman
(74) *Attorney, Agent, or Firm* — Birch, Stewart, Kolasch & Birch, LLP

(57) ABSTRACT

An image display apparatus includes a first power source line and a second power source line, which are connected to a plurality of pixel circuits, each of which includes a light-emitting device and a drive device that drives the light-emitting device; an image signal line that applies an image data potential depending on an emission brightness of the light-emitting device to the drive device; and a drive control unit (timing controller, X driver, Y driver) that controls a magnitude and an output timing of a potential applied to the image signal line, and controls a magnitude and an output timing of a potential applied to the first power source line and the second power source line, in order to perform an emission control to the respective pixel circuits all at once in all pixel circuits. The drive control unit gradually changes an image data potential of the image signal line from a first potential serving as a reference potential to a second potential serving as a constant potential so as to start the emission of the light-emitting device.

7 Claims, 9 Drawing Sheets

U.S. PATENT DOCUMENTS

| | | | |
|---|---|---|---|
| 2006/0202633 | A1 | 9/2006 | Onoda |
| 2006/0208977 | A1 | 9/2006 | Kimura |
| 2006/0221015 | A1 | 10/2006 | Shirasaki et al. |

FOREIGN PATENT DOCUMENTS

| | | | |
|---|---|---|---|
| CN | 1822083 | A | 8/2006 |
| CN | 1848223 | A | 10/2006 |
| JP | 2006-178028 | A | 7/2006 |
| JP | 2006-227337 | A | 8/2006 |
| JP | 2006-284959 | A | 10/2006 |
| JP | 2007-219339 | A | 8/2007 |
| KR | 10-2005-0075754 | A | 7/2005 |
| KR | 10-2006-0101401 | A | 9/2006 |

OTHER PUBLICATIONS

R.M.A. Dawson et al., "Design of an Improved Pixel for a Polysilicon Active-Matrix Organic LED Display" SID98 Digest, pp. 11 to 14, 1998.

FIG.5

| PROCESS | STEP NO. | DESCRIPTION OF PROCESS |
|---|---|---|
| if rising_HSYNC then | | ・RISING OF HSYNC |
| if VSYNC = 1 then | STEP 1 | ・PROCESS WHEN VSYNC IS 1 |
| if Ctrl_P = 1 and Ctrl_N = 1 then<br>COUNT = 0<br>end if | STEP 2<br>STEP 3 | ・CLEAR COUNTER WHEN LOGIC AT START OF LIGHT-EMITTING PERIOD IS INPUT |
| if COUNT < N then<br>COUNT = COUNT + 1<br>end if | STEP 4<br>STEP 5 | ・COUNT UP WHEN COUNTER VALUE DOES NOT REACH N |
| if COUNT /= N then<br>Xdata 1 = COUNT*A*Xdata 0 | STEP 6<br>STEP 7 | ・INPUT VALUE PROPORTIONAL TO COUNTER VALUE TO Xdata1, WHEN COUNTER VALUE DOES NOT REACH N |
| else<br>Xdata 1 = Xdata 0<br>end if | STEP 8 | ・OUTPUT Xdata0 DURING NORMAL DRIVE AS Xdata1 WHEN COUNTER VALUE REACHES N |
| else | | ・PROCESS WHEN VSYNC IS 0 |
| OUT_P = Fn_outp(Ctrl_P,Ctrl_N)<br>OUT_N = Fn_outn(Ctrl_P,Ctrl_N) | STEP 9 | ・POTENTIAL OF FIRST POWER SOURCE LINE IS DETERMINED BY LOGIC SIGNALS Ctrl_P AND Ctrl_N |
| end if; | | ・POTENTIAL OF SECOND POWER SOURCE LINE IS DETERMINED BY LOGIC SIGNALS Ctrl_P AND Ctrl_N |
| end if; | | |

FIG.6
(a) UPON HIGH BRIGHTNESS
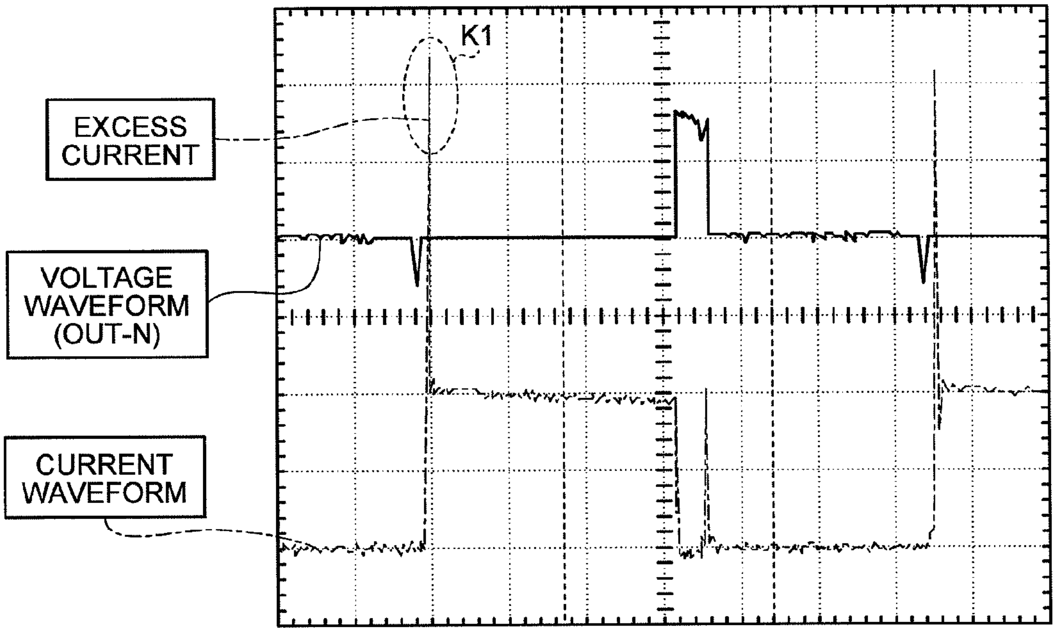
(b) UPON LOW BRIGHTNESS
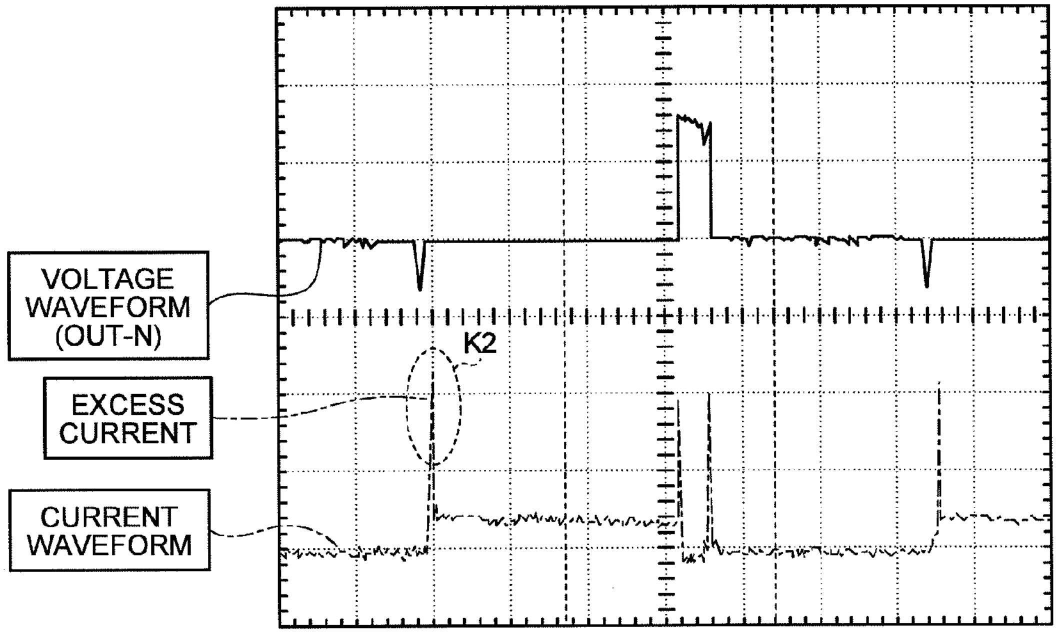

(a) UPON HIGH BRIGHTNESS (b) UPON LOW BRIGHTNESS

IMAGE DISPLAY APPARATUS

TECHNICAL FIELD

The present invention relates to an image display apparatus having a light-emitting device.

BACKGROUND ART

There has conventionally been proposed an image display apparatus using an organic EL (Electroluminescence) device that has a function of emitting light because of a recombination of a hole and an electron injected into a luminescent layer.

In the image display apparatus, a thin film transistor (TFT) made of, for example, an amorphous silicon or a polycrystalline silicon, or an organic light-emitting diode (OLED) that is one of an organic EL devices, constitute each pixel, and the respective pixels are arranged in a matrix. A suitable current value is set to the respective pixels and thus the brightness of each pixel is controlled, whereby a desired image is displayed.

There is an image display apparatus of an active matrix type including a plurality of pixels, each of which has a light-emitting device and a drive transistor such as a TFT arranged in series (for example, R. M. A. Dawson, et al. (1998). Design of an Improved Pixel for a Polysilicon Active-Matrix Organic LED Display. SID98 Digest, pp. 11 to 14).

A system for performing a light-emitting control for each pixel in the image display apparatus described above includes a batch emission system and a sequential emission system. In the batch emission system, a writing of a potential of an image signal to each pixel circuit is sequentially executed per a predetermined unit (for example, per a line, per a row, etc.), while a light-emitting control for the respective pixel circuits is executed all together for all pixel circuits. On the other hand, in the sequential emission system, the writing of the potential of the image signal to each pixel circuit and the light-emitting control to each pixel circuit are both sequentially performed per a predetermined group (for example, per a line, per a row, etc.).

Since a control of the writing of the potential of the image signal to each pixel circuit and the light-emitting control to each pixel circuit are both sequentially performed per a predetermined group in the sequential emission system, a peak of a load is distributed, so that an impact applied to a power source capacity of a power source apparatus is small. On the other hand, the light-emitting control is performed all together for all pixel circuits in the batch emission system, whereby the peak of the load is concentrated, and hence, the affect given to the power source capacity of the power source apparatus is increased. Therefore, when the scales (pixel numbers) of the pixel circuits are equal to one another, there arises a problem that a power source apparatus having a capacity greater than that of a power source apparatus used in the sequential emission system has to be prepared in the image display apparatus of the batch emission system.

DISCLOSURE OF INVENTION

Problems to be Solved by the Invention

The present invention aims to provide an image display apparatus driven with the batch emission system, the image display apparatus being capable of reducing the affect given to a power source capacity of a power source apparatus.

Means for Solving Problem

An image display apparatus according to a first embodiment of the present invention includes: a plurality of pixel circuits, each of which includes a light-emitting device and a drive device that drives the light-emitting device; a power source line connected to the respective pixel circuits; an image signal line that applies an image data potential depending on an emission brightness of the light-emitting device to the drive device; and a drive control unit that controls a magnitude and an output timing of a potential applied to the image signal line, and controls a magnitude and an output timing of a potential applied to the power source line, in order to perform an emission control to the respective pixel circuits all at once in all pixel circuits, wherein the drive control unit gradually changes an image data potential of the image signal line from a first potential serving as a reference potential to a second potential serving as a constant potential so as to start the emission of the light-emitting device.

Effect of the Invention

The present invention can provide an image display apparatus that is driven with a batch emission system, and that can reduce an affect to a power source capacity of a power source apparatus.

BRIEF DESCRIPTION OF THE DRAWINGS

FIG. 5 is a diagram illustrating one example of a program code for realizing the function of the timing controller 1.

FIG. 6 is a diagram illustrating a result of a measurement of a voltage waveform and a current waveform when the control technique according to one embodiment is not used.

BEST MODE(S) FOR CARRYING OUT THE INVENTION

An image display apparatus according to one embodiment of the present invention will be described in detail with reference to the drawings. It is to be noted that the present invention is not limited to the embodiment below.

<Schematic Configuration of Image Display Apparatus>

Figure 1:
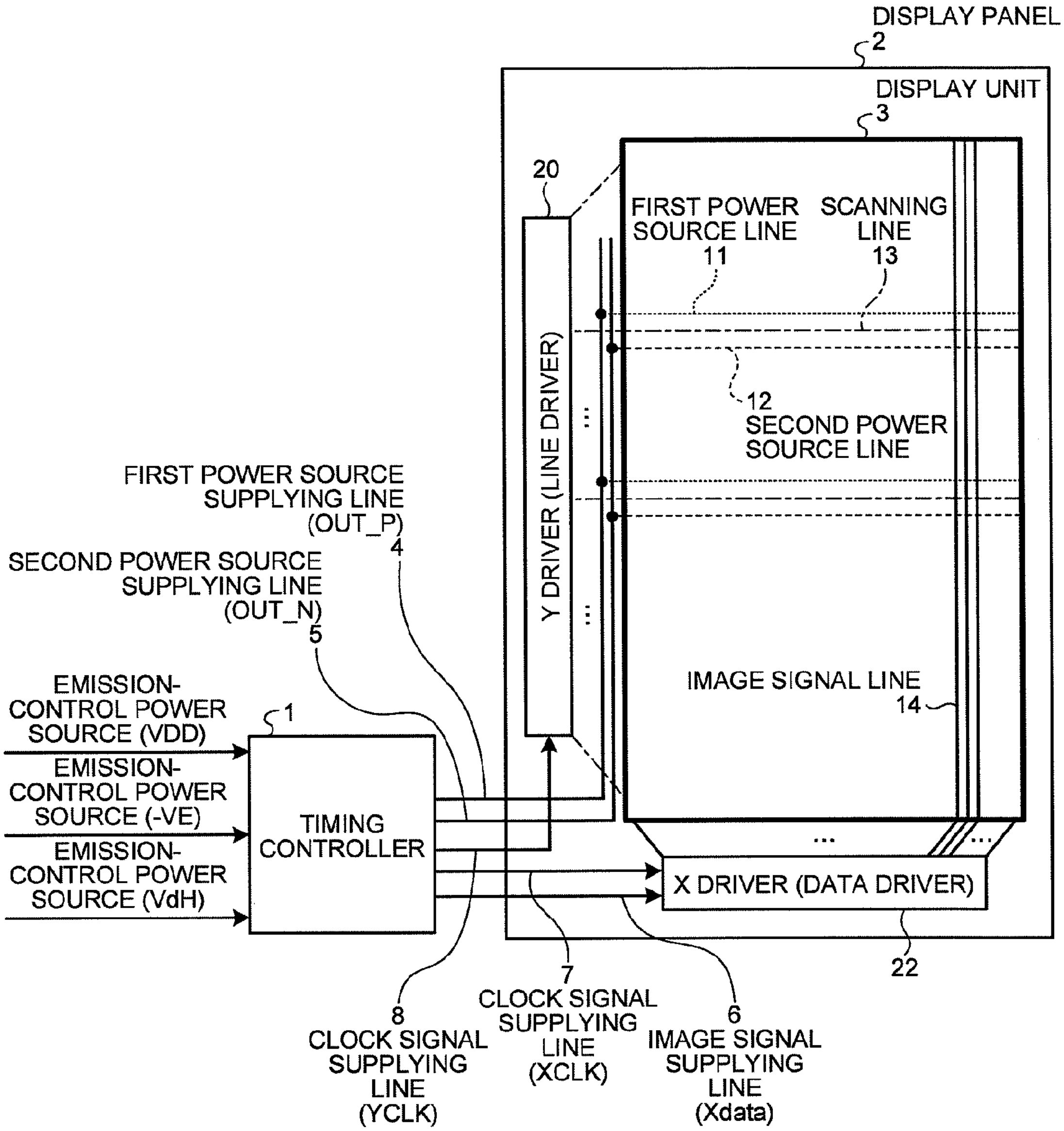
FIG. 1 is a diagram illustrating a configuration of an image display apparatus according to one embodiment of the present invention.

In FIG. 1, the image display apparatus includes a timing controller 1 and a display panel 2. The display panel 2 is provided with a display unit 3 having mounted thereto wirings including a first power source line 11, a second power source line 12, a scanning line 13, and an image signal line 14. The display panel 2 is also provided with a Y driver (line driver) 20 that applies a predetermined potential to the scanning line 13 at a desired timing and an X driver (data driver) 22 that applies a predetermined potential to the image signal line 14 at a desired timing. In the wirings, the first power source line 11, the second power source line 12, and the scanning line 13 are arranged in a predetermined direction (in the lateral direction in an example shown in FIG. 1) at the display unit 3. The scanning line 13 is connected to the Y driver 20. The image signal line 14 is arranged along the direction different from (substantially orthogonal to) the direction of the first power source line 11, the second power source line 12, and the scanning line 13, and is connected to the X driver 22.

On the display unit 3, there are provided a plurality of pixels (pixel circuit) including organic light-emitting diodes (organic light-emitting device) that are connected to the first power source line 11, the second power source line 12, the scanning line 13, and the image signal line 14, and that are arranged in a matrix.

The timing controller 1 is provided at the outside of the display panel 2. The timing controller 1 is composed of control devices such as a drive IC or a counter including an operation circuit, logic circuit, etc. therein. The timing controller 1 controls the timing of supplying input image data or three types of emission-control power sources (VDD, −VE, VdH), which are exemplarily illustrated as the power source input for allowing the display unit 3 to display the image data, to the X driver 22 or the Y driver 20. The X driver 22, the Y driver 20, and the timing controller 1 are the components corresponding to a drive control unit in the present invention.

The X driver 22 is composed by using a drive IC, etc. having an operation circuit, etc. provided therein. The X driver 22 produces a potential (hereinafter referred to as "image data potential") corresponding to an image data signal, which is input from the timing controller 1 through an image signal supplying line 6, based on the image data signal. The X driver 22 also controls the timing of supplying the produced image data potential to the image signal line 14 based on a clock signal (XCLK) input from the timing controller 1 through a clock signal supplying line 7.

The Y driver 20 is composed by using, for example, a drive IC, etc. having a switch device, etc. provided therein. The Y driver 20 controls the timing of applying a control signal, which is produced in the Y driver 20, to the scanning line 13 based on the clock signal (YOLK) input from the timing controller 1 through a clock signal supplying line 8.

An applied potential (OUT_P) to the first power source line 11 is directly applied by using a first power source supplying line 4 without using the Y driver 20. Similarly, an applied potential (OUT_N) to the second power source line 12 is directly applied by using a second power source supplying line 5 without using the Y driver 20.

The layout relating to the first power source line 11, the second power source line 12, the scanning line 13, the image signal line 14, the Y driver 20, and the X driver 22 on the display unit 3 in FIG. 1 is only illustrative, and the layout is not limited to the one illustrated in FIG. 1.

For example, the Y driver 20 and the X driver 22 are arranged on the display panel in FIG. 1. However, they may be arranged at the outside of the display panel 2. Although the timing controller 1 is arranged at the outside of the display panel 2 in FIG. 1, it may be arranged within the display panel 2.

<Configuration of Pixel Circuit>

Figure 2:
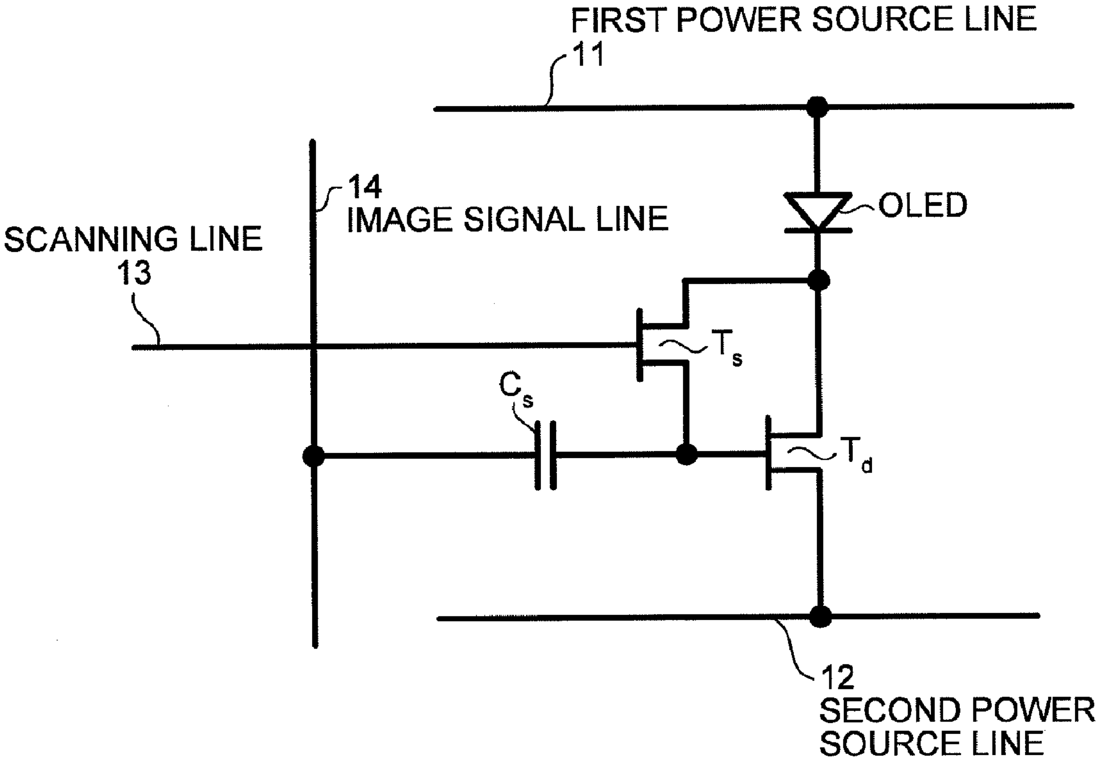
FIG. 2 is a diagram illustrating a configuration of a pixel circuit (one pixel) provided to a display panel 2 illustrated in FIG. 1.

A pixel circuit illustrated in FIG. 2 is arranged on the display panel 2 in a matrix. Each of the pixel circuits is configured to include an organic light-emitting device OLED that is one of organic EL devices, a drive transistor $T_d$, a threshold-voltage detecting transistor $T_s$, and a capacitor $C_s$ that holds a threshold voltage ($V_{th}$) and an image signal potential.

In FIG. 2, the drive transistor $T_d$ is a driver device for controlling an amount of current flowing through the organic light-emitting device OLED according to the potential difference applied between a gate electrode and a source electrode. The threshold-voltage detecting transistor $T_s$ has a function (hereinafter referred to as "$V_{th}$ detecting function") in which, when it is turned ON, it electrically connects the gate electrode and a drain electrode of the drive transistor $T_d$ to flow current from the gate electrode to the drain electrode of the drive transistor $T_d$ so as to make the potential difference between the gate electrode and the source electrode of the drive transistor $T_d$ close to the threshold voltage $V_{th}$ of the drive transistor $T_d$, resulting in allowing the potential difference between the gate electrode and the source electrode of the drive transistor $T_d$ to be close to the threshold voltage $V_{th}$ or to be the threshold voltage $V_{th}$.

The organic light-emitting device OLED is a device having a characteristic that, when the potential difference (voltage between an anode and a cathode) not less than the threshold voltage is produced between both ends of the device, allows a current to flow through it and emits light. The organic light-emitting device OLED has a configuration including at least an anode layer and a cathode layer, which are made of Al, Cu, Indium Tin Oxide (ITO), etc., and a light-emitting layer formed between the anode layer and the cathode layer and made of an organic material such as phthalocyanine, trisaluminum complex, benzoquinolinolate, beryllium complex, etc. It has a function of emitting light due to a recombination of a hole and an electron injected into the light-emitting layer.

The drive transistor $T_d$ and the threshold-voltage detecting transistor $T_s$ are, for example, thin-film transistors. Any type, i.e., N-type and P-type, may be used for the channel (N-type or P-type) of the respective thin-film transistors in the respective drawings. In the present embodiment, N-type is used.

The first power source line 11 and the second power source line 12 apply to the organic light-emitting device OLED or the drive transistor $T_d$ a predetermined potential (variable potential) according to their operation periods. The scanning line 13 supplies a signal for controlling the threshold-voltage detecting transistor $T_s$. The image signal line 14 supplies the image signal corresponding to the emission brightness of the organic light-emitting device OLED to the capacitor $C_s$.

<Operation of Pixel Circuit>

Figure 3:
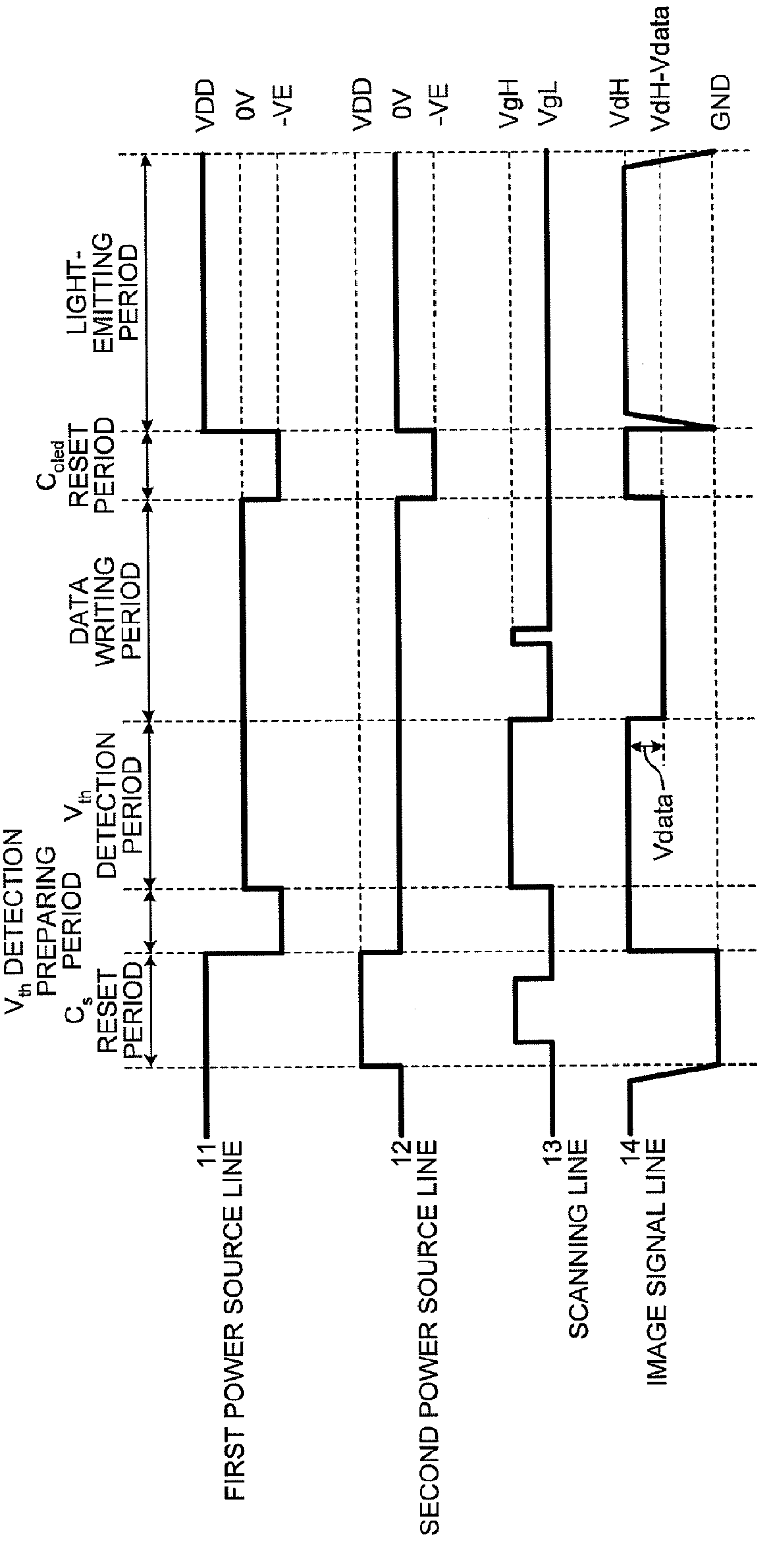
FIG. 3 is a sequence diagram for describing an operation of the pixel circuit illustrated in FIG. 2.

Next, the operation of the pixel circuit illustrated in FIG. 2 will be described with reference to FIGS. 2 and 3. In the pixel circuit illustrated in FIG. 2, the pixel circuit operates through six periods that are $C_s$ reset period, $V_{th}$ detection preparing period, $V_{th}$ detection period, data writing period, $C_{oled}$ reset period, and light-emitting period. Among these operations, the operation during the light-emitting period is executed based on the later-described detailed block diagram of the timing controller 1 illustrated in FIG. 4 and a process flow illustrated in FIG. 5. Here, the outline of the operation is described, and the detail of the operation will be described later.

($C_s$ Reset Period)

In the $C_s$ Reset Period, the First Power Source Line 11 is set to have a high potential (VDD), the second power source line 12 is set to have a high potential (VDD), the scanning line 13 is set to have a high potential (VgH), and the image signal line 14 is set to have a zero potential (GND). With this control, the threshold-voltage detecting transistor $T_s$ is turned on, and the drive transistor $T_d$ is turned off, whereby current flows through a path of the first power source line 11→the organic light-emitting device OLED→the threshold-voltage detecting transistor $T_s$→the capacitor $C_s$. The charge of the capacitor $C_s$ is reset by that the capacitor $C_s$ is charged. The reason why the capacitor $C_s$ is charged during the $C_s$ reset period is to reset the image signal potential written in the capacitor $C_s$ in a previous frame.

($V_{th}$ Detection Preparing Period)

In the $V_{th}$ Detection Preparing Period, the First Power source line 11 is set to have a minus potential (−VE), the second power source line 12 is set to have a zero potential (GND), the scanning line 13 is set to have a low potential (VgL), and the image signal line 14 is set to have a high potential (VgH). With this control, the threshold-voltage detecting transistor $T_s$ is turned off, and the drive transistor $T_d$ is turned on, whereby current flows through a path of the second power source line 12→the drive transistor $T_d$→the organic light-emitting device OLED. Then, charges are accumulated on a device capacity (hereinafter referred to as "device capacity $C_{oled}$") that the organic light-emitting device OLED peculiarly has. The reason why the charges are accumulated on the organic light-emitting device OLED during the $V_{th}$ detection preparing period is to allow the organic light-emitting device OLED to serve as a supply source of current, which flows between the drain and the gate of the drive transistor $T_d$, when the voltage between the gate and the source of the drive transistor $T_d$ is made close to the threshold voltage during the later-described $V_{th}$ detecting period.

($V_{th}$ Detecting Period)

During the $V_{th}$ Detecting Period, the First Power source line 11 is set to have a zero potential (GND), and the scanning line 13 is set to have a high potential (VgH), while the image signal line 14 is kept to be high potential (VdH), and the second power source line 12 is kept to be zero potential (GND). With this control, the threshold-voltage detecting transistor $T_s$ is turned on, and the gate and the drain of the drive transistor $T_d$ are connected to each other.

The charges accumulated on the capacitor $C_s$ and the organic light-emitting device OLED are discharged, whereby current flows through a path of the capacitor $C_s$→the threshold-voltage detecting transistor $T_s$→the drive transistor $T_d$→the second power source line 12 and the path of the organic light-emitting device OLED→the drive transistor $T_d$→the second power source line 12. When the voltage $V_{gs}$ between the gate and the source of the drive transistor $T_d$ reaches the threshold voltage $V_{th}$, the drive transistor $T_d$ is turned off, resulting in that the threshold voltage $V_{th}$ of the drive transistor $T_d$ is detected.

(Data Writing Period)

During the data writing period, the image signal potential (−Vdata) is reflected on the capacitor $C_s$ so as to change the gate potential of the drive transistor $T_d$ to a desired potential. More specifically, the first power source line 11 is kept to be zero potential (GND), and the second power source line 12 is kept to be zero potential (GND) respectively. The image signal line 14 is set to have a potential (VdH−Vdata) obtained by subtracting the image signal potential (Vdata) from the potential (VdH) applied during the $V_{th}$ detecting period, and the scanning line 13 is set to have a high potential (VgH) during a predetermined period in the data writing period.

With this control, the threshold-voltage detecting transistor $T_s$ is turned on, and the charges accumulated on the device capacity $C_{oled}$ are discharged, whereby current flows through a path of the organic light-emitting device OLED→threshold-voltage detecting transistor $T_s$→capacitor $C_s$. That is to say, the charges accumulated on the organic light-emitting device OLED move to the capacitor $C_s$. As a result, predetermined charges determined based on the image signal potential (Vdata) are accumulated on the capacitor $C_s$.

Since the capacitor $C_s$ and the organic light-emitting device OLED are connected in series during the data writing period, the decreased amount of the potential at one end (the end connected to the gate of the drive transistor $T_d$) of the capacitor $C_s$ is not equal to the decreased amount (Vdata) of the potential of the image signal line 14, but is affected by the capacity ratio between the capacitor $C_s$ and the organic light-emitting device OLED.

($C_{oled}$ Reset Period)

During the $C_{oled}$ Reset Period, the First Power Source line 11 is set to have a minus potential (−VE), and the second power source line 12 is also set to have a minus potential (−VE). On the other hand, the scanning line 13 is kept to have a low potential (VgL), and the image signal line 14 is kept to have a high potential (VdH). In this case, the threshold-voltage detecting transistor $T_s$ is turned off, and the drive transistor $T_d$ is turned on, whereby current flows through a path of the organic light-emitting device OLED→the drive transistor $T_d$→the second power source line 12. Thereby, the charges remaining on the organic light-emitting device OLED are discharged. The reason why the charges on the device capacity $C_{oled}$ are discharged during the $C_{oled}$ reset period is to avoid the influence of the charges remaining on the device capacity $C_{oled}$ to the emission.

(Light-Emitting Period)

During the light-emitting period, the first power source line 11 is set to have a high potential (VDD), the second power source line 12 is set to have a zero potential (GND), and the scanning line 13 is kept to have a low potential (VgL). In this way, the first power source line 11 is changed from the minus potential (−VE) that is the third potential to the high potential (VDD) that is the fourth potential at the time of starting the light-emitting period. On the other hand, the image signal line 14 is once lowered to the GND level that is the first potential that is a reference potential immediately after the start of the light-emitting period. Thereafter, it is increased to the high potential (VdH) that is the second potential that is a constant potential, and the level of the high potential (VdH) is maintained. Further, the potential of the image signal line 14 is lowered to the GND level immediately before the completion of the light-emitting period. Specifically, in the control from the start of the emission during the light-emitting period, the potential of the image signal line 14 is not raised at once until the current flowing through the organic light-emitting device OLED in the pixel circuit, which is to be controlled, reaches a level required to emit light with a desired emission brightness, but it is controlled such that the current flowing through the organic light-emitting device OLED is gradually increased. In the control to the stop of the emission during the light-emitting period, the potential of the image signal line 14 is not lowered at once until the current flowing through the organic light-emitting device OLED in the pixel circuit, which is to be controlled, reaches a non-luminescent level (black level), but it is controlled such that the current flowing through the organic light-emitting device OLED is gradually decreased. Accordingly, the time taken for setting the potential of the image signal line 14 to the second potential from the first potential is longer than the time taken for setting the potential of the first power source line 11 from the third potential to the fourth potential.

The time taken for increasing the potential of the image signal line 14 to the second potential from the first potential from the start of the light-emitting period will be described. Firstly, a following model is supposed. In the consideration of a transient phenomenon in which the image signal line 14 is increased, the organic light-emitting device OLED is modeled as a capacity device, and the drive transistor $T_d$ is modeled as an electric resistance. That is, a circuit having the capacity device and the electric resistance that are connected in series between the first power source line 11 and the second power source line 12 is supposed. Here, the first power source line 11 has a high potential at the time of starting the light-emitting period, so that a potential difference is produced between the first power source line 11 and the second power source line 12. Current flows between them because of the potential difference, but when the electric resistance is small, large current unfavorably flows to the capacity device. In view of this, the electric resistance is increased to gradually accumulate charges on the capacity device, whereby the flow of large current to the capacity device can be restrained. The time taken for the image signal line 14 being set to have the high potential (VdH) from the GND level is set to be 50 μs or more and 350 μs or less, for example.

Considering the state of the drive transistor $T_d$ at the time of starting the light-emitting period, the potential depending on the brightness of a picture, which is to be displayed, is written between the gate and the source. As a result, the resistance component of the drive transistor $T_d$ is small during the setting of displaying a bright image, which brings a state in which current is liable to flow through the drive transistor $T_d$. Therefore, excess current might flow through the input end of the light-emission control power source (VDD) immediately after the start of the emission. When the charges are accumulated on the capacity component of the organic light-emitting device OLED by gradually increasing the potential of the image signal line as in the present embodiment, the excess current can be reduced. When the resistance component of the drive transistor $T_d$ is increased to restrain the rapid current flow through the drive transistor $T_d$, the generation of the excess current on the light emission control power source (VDD) can be restrained, regardless of the brightness of the picture that is to be displayed.

The method of stepwisely increasing the potential of the image signal line 14 will be described. The necessity of the stepwise increase is as follows. The potential of the image signal line 14, which is needed to avoid the generation of the excess current on the light-emission control power source (VDD), has to be determined considering the temperature characteristic or the characteristic variation of the drive transistor $T_d$. However, it is difficult to obtain these factors beforehand. As a result, the potential of the image signal line 14 is stepwisely changed from the GND level to the high potential (VdH), while in each step the condition in which potential is set to stepwisely changed level is maintained, thereby the excess current can be restrained.

When the potential of the image signal line 14 is gradually decreased at the last point of the light-emitting period, the electric resistance of the drive transistor $T_d$ is increased so as to gradually decrease the current flowing through the first power source line 11 and the second power source line 12. If the potential of the image signal line 14 is not gradually decreased, current tends to keep on flowing between both the first power source line 11 and the second power source line 12 due to the inductance component present on the first power source line 11 and the second power source line 12. A large induction voltage is thus applied between the drain and the source of the drive transistor $T_d$ due to the inductance component, which might give adverse affect to the lifetime of the drive transistor $T_d$. On the other hand, in the present embodiment, the potential of the image signal line 14 is gradually decreased to decrease the induction voltage, with the result that the product lifetime of the drive transistor $T_d$ can be increased.

With this control, the on-state of the drive transistor $T_d$ and the off-state of the threshold-voltage detecting transistor $T_s$ are continued, while a forward bias voltage is applied to the organic light-emitting device OLED. Therefore, current flows through a path of the organic light-emitting device OLED→the drive transistor $T_d$→the second power source line 12, whereby the organic light-emitting device OLED emits light. As described above, during the control from the start of the emission, the potential of the image signal line 14 is gradually increased, so that the emission brightness is gradually increased, while during the control by the time of the stop of the emission, the potential of the image signal line 14 is gradually decreased, so that the emission brightness is gradually decreased.

<Configuration and Function of Timing Controller 1>

Subsequently, a configuration and a function of the timing controller 1 will be described with reference to FIG. 4.

Figure 4:
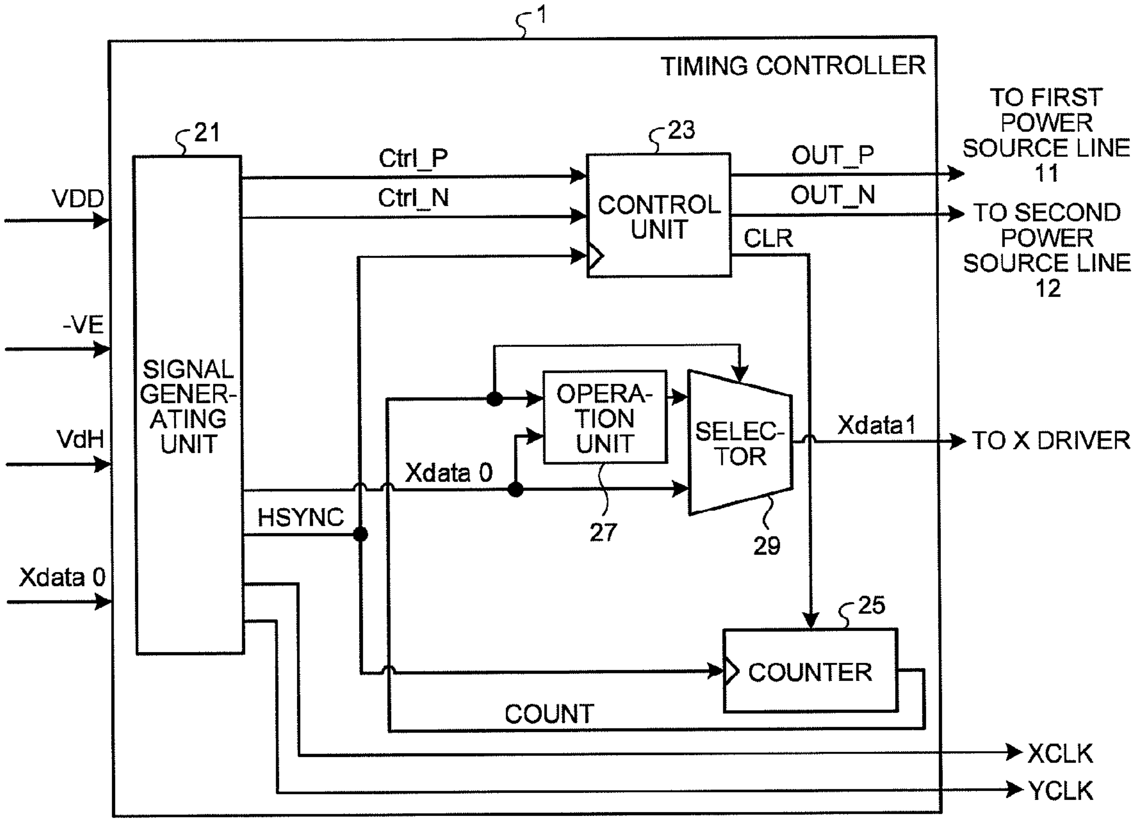
FIG. 4 is a block diagram illustrating a detailed configuration of a timing controller 1 illustrated in FIG. 1.

In FIG. 4, the timing controller 1 includes a signal generating unit 21, a control unit 23, a counter 25, an operation unit 27, and a selector 29. The above-mentioned three types of emission-control power sources (VDD, −VE, VdH) and the image data (Xdata0) are input to the timing controller 1. The signal generating unit 21 generates and outputs a logic signal (Ctrl_P, Ctrl_N) necessary for producing a potential waveform, a logic signal (HSYNC) necessary for a synchronous control of the image display, and a clock signal (XCLK, YCLK) necessary for the synchronous control. The signal generating unit 21 also controls the output timing of the input image data (Xdata0).

The control unit 23 determines and outputs a potential (OUT_P) applied to the first power source line 11 based on the logic signal (Ctrl_P) input from the signal generating unit 21. The control unit 23 also determines and outputs a potential (OUT_N) applied to the second power source line 12 based on the logic signal (Ctrl_N) input from the signal generating unit 21. The applied potential (OUT_P) output from the control unit 23 corresponds to the potential applied to the first power source line 11 in the sequence diagram in FIG. 3, while the applied potential (OUT_N) output from the control unit 23 corresponds to the potential applied to the second power source line 12 in the sequence diagram in FIG. 3.

The counter 25 outputs the count value (COUNT) obtained by counting the input logic signal (HSYNC) to the operation unit 27 and the selector 29. The count value counted by the counter 25 is cleared by the control signal (CLR) output from the control unit 23, and then, the counting process is again executed.

The operation unit 27 executes the operation of modified image data, which is obtained by modifying the image data from the signal generating unit 21, based on the count value from the counter 25, and outputs the resultant to the selector 29.

The selector 29 selects either one of the image data input from the signal generating unit 21 and the modified image data input from the operation unit 27 based on the count value from the counter 25, and outputs the selected one to the X driver 22. That is, the selector 29 executes a process of selecting either one of the image data and the modified image data.

The control unit 23, the counter 25, the operation unit 27, and the selector 29 are components corresponding to an image data generating unit in the present invention.

FIG. 5 is a diagram illustrating one example of a program code for realizing the function of the above-mentioned timing controller 1, and particularly illustrating one example of a program code for performing an emission control immediately after the start of the emission. The program code for performing the emission control immediately before the stop of the emission can be described in accordance with FIG. 5.

In FIG. 5, it is firstly determined whether it is the light-emitting period or not based on the logic signal (VSYNC) (step S1). When it is determined not to be the light-emitting period in step S1 (e.g., VSYNC=0), the program proceeds to a process in step S9. In the process in step S9, a potential applied to the first power source line 11 and a potential applied to the second power source line 12 are respectively determined based on the logic signals (Crtl_P, Crtl_N).

It is determined to be the light-emitting period in step S1 (e.g., VSYNC=1), it is further determined that it is the start of the light-emitting period or not based upon the logic signals (Crtl_P, Crtl_N) (step S2). When it is determined not to be the start of the light-emitting period (e.g., Crtl_P=0, or Crtl_N=0), the program proceeds to a process in later-described step S4. When it is determined to be the start of the light-emitting period (e.g., Crtl_P=1, and Crtl_N=1), the process of clearing the count value of the counter 25 is executed (step S3).

Then, it is determined whether the count value of the counter 25 reaches a predetermined value (N) or not (step S4). When the count value does not reach the predetermined value (N), the counting process of the counter is executed (step S5). Further, the count value (COUNT) and a predetermined coefficient (A) are multiplied by the image data input from the signal generating unit 21, and the multiplication value is output as the modified image data described above (steps S6, S7).

On the other hand, when the count value reaches the predetermined value (N), the image data input from the signal generating unit 21 is output (steps S6, S8). Namely, in the processes in steps S6 to S8, when the count value does not reach the predetermined value (N), the value proportional to the count value is set as the modified image data, while when the count value reaches the predetermined value (N), the input image data is set.

The control at the time of the start of the emission has been described above. The control at the time of stopping the emission is similar to the control described above. Although the detailed explanation will not be described, the control will schematically be described below.

It is firstly determined whether it is the control period for stopping the emission in the light-emitting period or not based on the input logic signal (Crtl_P, Crtl_N). When it is determined not to be the control period of stopping the emission, respective applied potentials (a potential applied to the first power source line 11 and a potential applied to the second power source line 12) determined based on the logic signal (Crtl_P, Crtl_N) are applied to the first power source line 11 and the second power source line 12 respectively.

On the other hand, it is determined to be the control period of stopping the emission, the process of counting down the count value of the counter 25 is executed. Further, it is determined whether the counted count value reaches a predetermined value (M, M is a positive integer satisfying M<N).

When the count value does not reach the predetermined value (M), the count value (COUNT) and a predetermined coefficient (B, this coefficient B may be the same as or different from the coefficient A) are multiplied by the image data input from the signal generating unit 21, and the multiplication value is output as the modified image data. When the count value reaches the predetermined value (M), the operation of the light-emitting period is completed. The process flow illustrated in FIG. 5 is described as a program code for realizing the function of the timing controller 1 as a software process, but it may be a hardware process based upon the respective functional blocks illustrated in FIG. 5.

<Rise Time and Fall Time of Image Data Potential>

Next, a rise time and a fall time of the image data potential applied to the image signal line 14 will be described. The display specification of the image display apparatus is supposed to be those described below.

(1) 1 frame: 16.6 ms (60 Hz)

(2) Light-emitting period in 1 frame: 8.3 ms (corresponding to 1/2 frame)

(3) Clock frequency of X driver: 16.6 μs (corresponding to 1/1000 frame)

The "rise time" of the image data potential means the time taken to allow the image signal line 14 to have a high potential (VdH) serving as the second potential from the GND potential serving as the first potential during the control period at the time of starting the emission. This time can also be grasped as the period in which the image data input through the timing controller 1 is replaced with modified image data. The rise time is preferably set to be about 300 μs, if the image display apparatus has the specification described above, from the viewpoint of securing the light-emitting period for emitting light with a desired brightness sufficient. It is more preferable that the rise time is set to be about 100 μs. During the rise time, the emission control for the respective pixel circuits is executed for all pixel circuits at once, which means that the peak of a load is concentrated on this period. Therefore, the affect given to the power source capacity of the power source device can be reduced by performing the above described control in which the potential of the image signal line 14 is controlled to be gradually increased from the GND level to the high potential (VdH).

The "fall time" of the image data potential means the time taken to allow the image signal line 14 to have the level of the GND potential from the level of the high potential (VdH) during the control period at the time of stopping the emission. This time can also be grasped as the period in which the image data input through the timing controller 1 is replaced with the modified image data.

Considering the characteristic of a general image display apparatus, the fall time is preferably set to be about 0.5 to 1 ms.

The reason why the preferable fall time is different from the preferable rise time depends upon the characteristic of the power source circuit used for a general image display apparatus. The power source circuit in the general image display apparatus employs a step-up circuit for generating a voltage of about 15 V from a low voltage of about 3 V, wherein an output is fed back to obtain a stable output. Therefore, the time until the voltage variation, in which voltage is increased due to the load variation, is suppressed by the feedback function so that voltage is returned to the stable output voltage is a guide of the time for controlling the image data potential. Although this time depends upon a switching frequency or a feedback system, it is approximately 0.5 to 1 ms.

Comparing the case in which the voltage variation, in which voltage is decreased due to the load variation, is suppressed so that voltage is returned to the original value and the case in which the voltage variation, in which voltage is increased due to the load variation, is suppressed so that voltage is returned to the original value, the time taken to return to the stable voltage is shorter in the former case than in the latter case. This depends upon the characteristic (the step-up capability is high, but step-down capability is low) of the step-up circuit. Accordingly, a period in which the voltage is recovered is shorter in the control period for stating the emission than in the control period for stopping the emission.

If 300 μs is taken for the rise of the image data potential and 1 ms is taken for the fall of the image data potential, the ratio of the (rise time+fall time) to the light-emitting period is (300+1000)/8300=13/83=15.7%. In this case, the period in which the potential corresponding to the emission brightness is applied can be secured so as to be about 84%, which means the light-emitting period for emitting light with the desired brightness can be sufficiently secured.

If 100 μs is taken for the rise of the image data potential and 0.5 ms is taken for the fall of the image data potential, the ratio of the (rise time+fall time) to the light-emitting period is (100+500)/8300=6/83=7.23%. In this case, the period in which the potential corresponding to the emission brightness is applied can be secured so as to be about 93%, which means the light-emitting period for emitting light with the desired brightness can be sufficiently secured.

As described above, the image display apparatus according to the present embodiment can reduce the affect given to the power source capacity of the power source apparatus, while sufficiently securing the light-emitting period for emitting light with the desired brightness.

The image display apparatus according to the present embodiment can employ the power source apparatus used for a general image display apparatus. Accordingly, the image display apparatus according to the present embodiment can reduce the affect given to the power source characteristic of the power source apparatus, while sufficiently securing the light-emitting period for emitting light with the desired brightness.

Next, the result of the actual measurement will be described.

Figure 7:
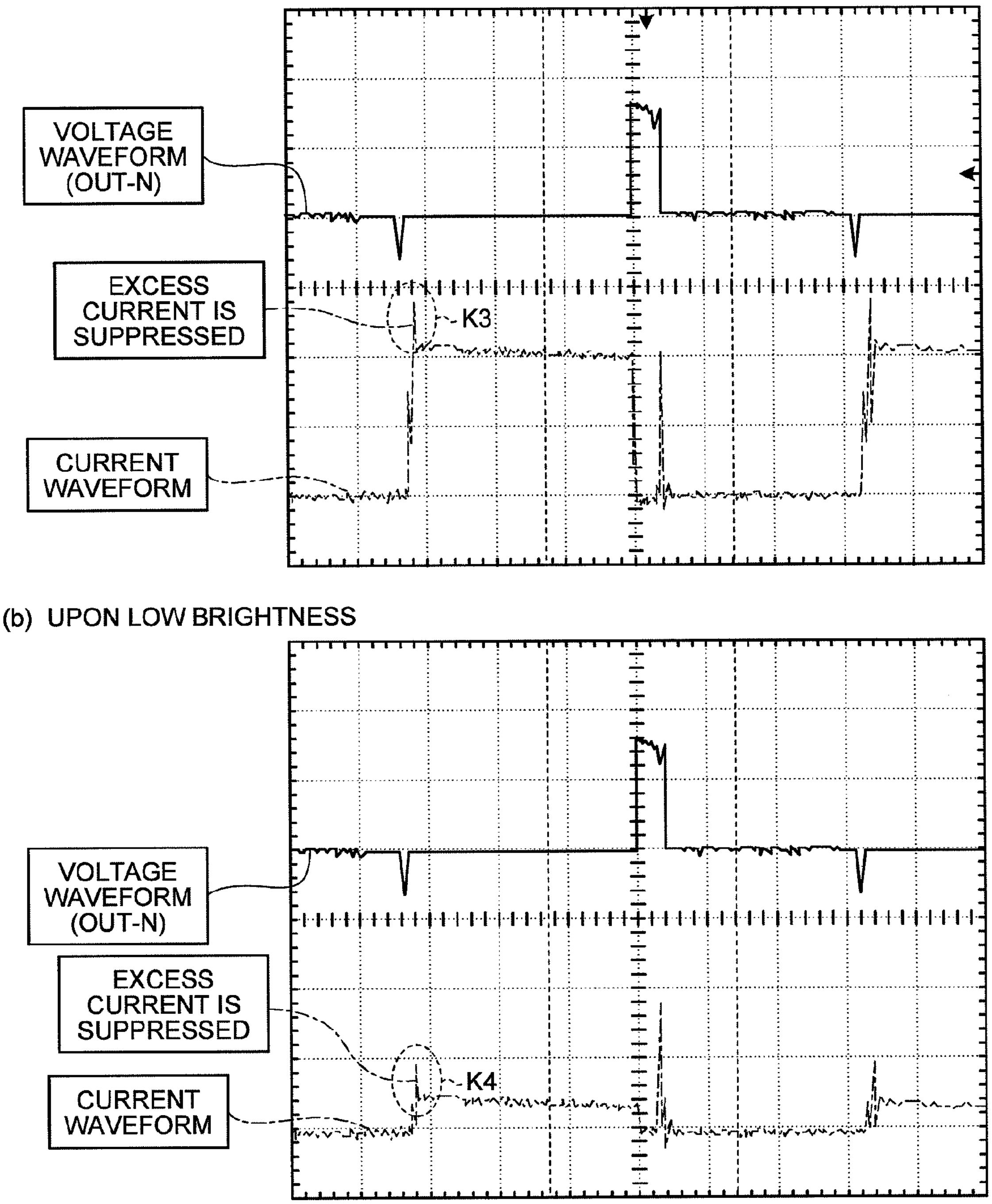
FIG. 7 is a diagram illustrating a result of a measurement of a voltage waveform and a current waveform when the control technique according to one embodiment is used.

In FIGS. 6 and 7, the waveform indicated by a solid line is a waveform of voltage applied to the second power source line 12 (see FIG. 3), and the waveform indicated by a one-dot-chain line is a current waveform measured at the input side (e.g., the input end of the emission-control power source (VDD): see FIG. 1) of the timing controller 1.

When the control technique according to the present embodiment is not used, and when the organic light-emitting device OLED is caused to emit light with a high brightness, for example, a large excess current is generated at the time of starting the emission as indicated by an elliptic portion K1 in FIG. 6(*a*), from which it is understood that the peak of the load is concentrated. This tendency also occurs in the case in which the organic light-emitting device OLED is caused to emit light with a low brightness as indicated by an elliptic portion K2 in FIG. 6(*b*).

On the other hand, when the control technique of the present embodiment is used, and when the organic light-emitting device OLED is caused to emit light with a high brightness, a large excess current is generated at the time of starting the emission as indicated by an elliptic portion K1 in FIG. 7(*a*), from which it is understood that the peak of the load is concentrated. As indicated by elliptic portions K3 and K4 in FIG. 7(*b*), it can be understood that the excess current can sufficiently be suppressed in both of the case in which the organic light-emitting device OLED is caused to emit light with a high brightness and the case in which the organic light-emitting device OLED is caused to emit light with a low brightness.

(Modification of Control Technique—Modification 1)

Figure 8:
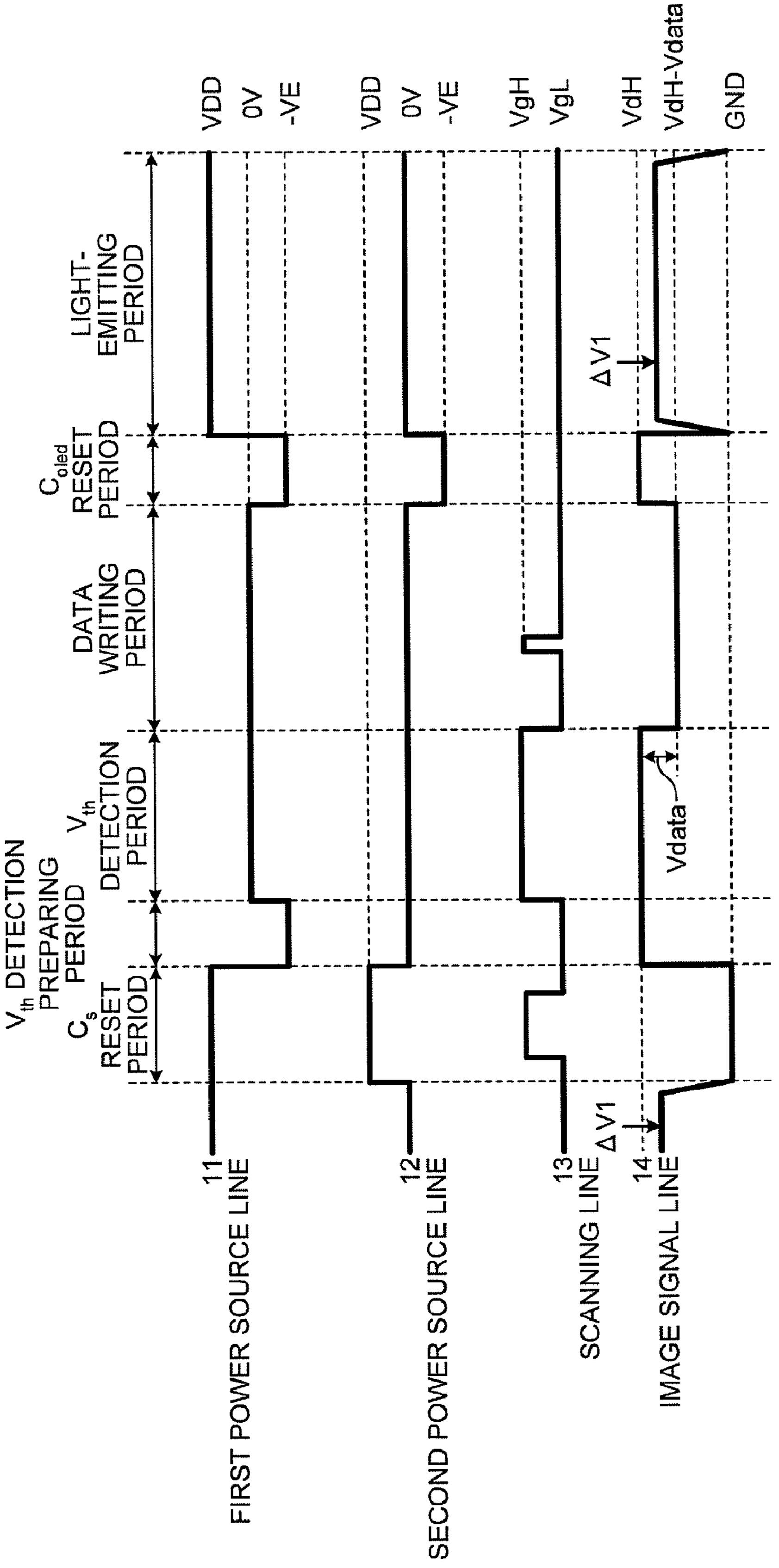
FIG. 8 is a sequence diagram illustrating a modification of the control technique according to one embodiment.

The different point in FIG. 8 from the sequence diagram illustrated in FIG. 2 is that, in light-emitting period when the potential, which is lowered to the GND level immediately after the start of the light-emitting period, is gradually raised, the potential after being raised is not set to be the high potential (VdH), but is kept to be a predetermined potential lower than the high potential (VdH) by ΔV1. As a result, the first potential maintained during the light-emitting period is "VdH−ΔV1".

According to the control technique illustrated in FIG. 8, the affect caused by variation in the property of the display panel of the image display apparatus can be suppressed. Specifically, the affect caused by the variation in the light-emitting property, which is caused by the variation in the property of the display panel, can be improved by varying ΔV1 that determines the potential level after the potential is raised. This control also provides an effect of being capable of shortening both the rise time and the fall time of the image data potential.

(Modification of Control Technique—Modification 2)

Figure 9:
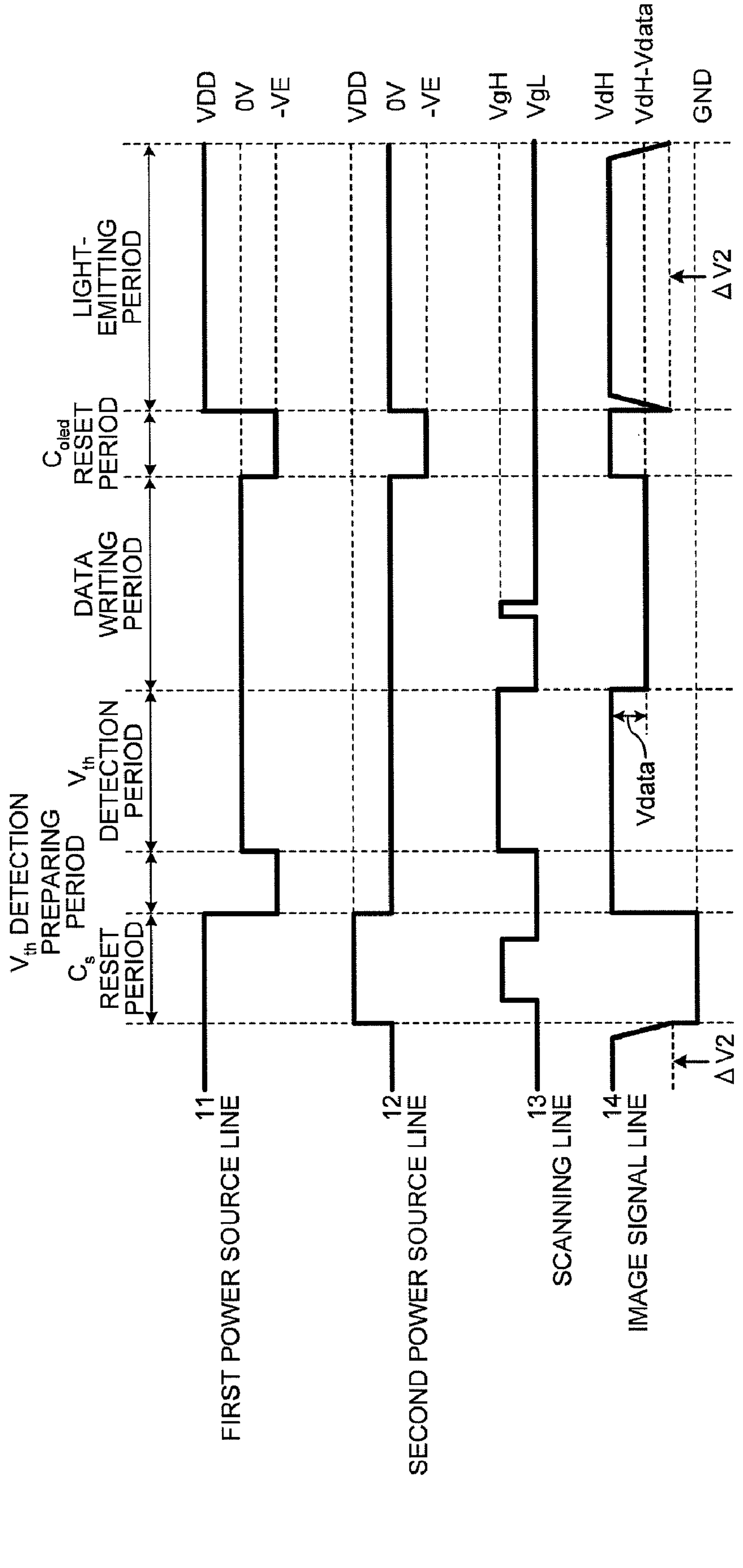
FIG. 9 is a sequence diagram illustrating a modification of the control technique according to one embodiment.

The different point in FIG. 9 from the sequence diagram illustrated in FIG. 2 is that the potential, which is once lowered after the start of the light-emitting period, is set to be the potential higher than the GND immediately, and the potential after being lowered at the time of stopping the emission is set to be a predetermined potential higher than the GND. As a result, the potential immediately after the start of the light-emitting period and the potential at the time of stopping the emission is "ΔV2".

According to the control technique illustrated in FIG. 9, an effect of being capable of shortening both the rise time and the fall time of the image data potential can be obtained by varying ΔV2 that is the potential level when it is lowered. The potential level ΔV2 when the potential is lowered can be varied within the range of 0<ΔV2<VdH−Vdata.

In the modifications 1 and 2, the level of the potential, which is lowered immediately after the start of the light-emitting period, and the level of the potential, which is lowered at the time of stopping the emission, are the same, but these potential levels may be different from each other.

In the present embodiment, the organic light-emitting device is taken as an example of a light-emitting device. However, the present invention is applicable to a light-emitting device other than the organic light-emitting device, for example, to a pixel circuit using an LED or an inorganic EL device.

In the above-mentioned embodiment, the drive transistor $T_d$ and the threshold-voltage detecting transistor $T_s$ are described as N-type transistor. However, the drive transistor $T_d$ and the threshold-voltage detecting transistor $T_s$ may be P-type transistors. Next, the case in which the drive transistor $T_d$ and the threshold-voltage detecting transistor $T_s$ are the P-type transistors will be described. The point different from the above-mentioned embodiment will only be described.

In order to bring the respective thin-film transistors into on-state when the respective thin-film transistors are P-type, the potential between the gate and the source of each of the thin-film transistors is set to be not more than the threshold voltage. Specifically, the gate potential is set to be not more than the threshold voltage of the thin-film transistor. Therefore, the timing controller 1 serving as the drive control unit once sets the potential of the image signal line 14 at the time of starting the emission by the light-emitting device to a potential greater than the image data potential by which the light-emitting device emits light, and then, gradually lowers the potential to the image data potential. The timing controller 1 also gradually raises the potential of the image signal line 14 to a potential between the image data potential and the threshold voltage upon stopping the emission by the light-emitting device. In this way, the potential of the image signal line is varied at the time of starting the emission or at the time of stopping the emission during the light-emitting period, whereby the magnitude of the excess current at the input end of the emission-control power source (VDD) can be reduced.

Industrial Applicability

As described above, the image display apparatus according to the present invention is useful as the invention capable of reducing the affect given to the power source capacity of the power source apparatus in the image display apparatus that is driven with a batch emission system.

The invention claimed is:

1. An image display apparatus comprising:

a plurality of pixel circuits, each of which includes a light-emitting device and a drive device that drives the light-emitting device;

a power source line connected to the respective pixel circuits;

an image signal line that applies an image data potential depending on an emission brightness of the light emitting device to the drive device; and a drive control unit that controls a magnitude and an output timing of a potential applied to the image signal line, and controls a magnitude and an output timing of a potential applied to the power source line, in order to perform an emission control to the respective pixel circuits all at once in all of the plurality of pixel circuits, wherein the drive control unit gradually changes an image data potential of the image signal line from a first potential serving as a reference potential to a second potential serving as a constant potential so as to start the emission of the light-emitting device, wherein the potential applied to the power source line is changed from a third potential to a fourth potential at the time of starting a light-emitting period by the light emitting device, and wherein the time taken for the image data potential of the image signal line to change from the first potential to the second potential is longer than the time taken for the potential applied to the power source line to change from the third potential to the fourth potential.

2. The image display apparatus according to claim 1, wherein the time taken for the image data potential of the image signal line to change from the first potential to the second potential is 50 μs or more and 350 μs or less.

3. The image display apparatus according to claim 1, wherein the image signal line reaches the second potential in such a manner that the potential is stepwisely changed from the first potential to the second potential.

4. The image display apparatus according to claim 1, wherein the power source line includes a first power source line and a second power source line that are connected to the respective pixel circuits, and both potentials of the first power source line and the second power source line are changed at once at the start of the light-emitting period.

5. The image display apparatus according to claim 4, wherein the light-emitting device is an organic light-emitting diode, and the first power source line is connected to an anode side of the organic light-emitting diode, while the second power source line is connected to a cathode side of the organic light-emitting diode.

6. The image display apparatus according to claim 1, wherein the drive control unit further includes an image data generating unit that determines a time point of starting the emission during the light-emitting period for adjusting the potential output to the image signal line depending on the elapsed time from the start of the emission.

7. The image display apparatus according to claim 1, wherein the image data potential of the image signal line maintains the second potential after starting the light-emitting period by the light emitting device.

* * * * *